US012280591B2

(12) United States Patent
Aoyagi

(10) Patent No.: US 12,280,591 B2
(45) Date of Patent: Apr. 22, 2025

(54) PRINTING SYSTEM

(71) Applicant: SEIKO EPSON CORPORATION, Tokyo (JP)

(72) Inventor: Masaki Aoyagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 205 days.

(21) Appl. No.: 18/328,806

(22) Filed: Jun. 5, 2023

(65) Prior Publication Data

US 2023/0391108 A1 Dec. 7, 2023

(30) Foreign Application Priority Data

Jun. 6, 2022 (JP) ................................ 2022-091397

(51) Int. Cl.
*B41J 11/00* (2006.01)
*G03G 15/00* (2006.01)

(52) U.S. Cl.
CPC ............ *B41J 11/007* (2013.01); *G03G 15/65* (2013.01); *G03G 2215/00586* (2013.01)

(58) Field of Classification Search
CPC ............ B41J 11/007; B41J 3/60; G03G 15/65
See application file for complete search history.

(56) References Cited

U.S. PATENT DOCUMENTS 6,018,640 A * 1/2000 Blackman .................. B41J 3/60 399/13
2011/0243637 A1* 10/2011 Nakamura ................. B41J 3/60 400/583

FOREIGN PATENT DOCUMENTS

JP 2019-026444 A 2/2019
KR 100697508 B1 * 3/2007

* cited by examiner

*Primary Examiner* — Sharon Polk
(74) *Attorney, Agent, or Firm* — Global IP Counselors, LLP

(57) ABSTRACT

A printing system performs first double-side printing when double-side printing is designated to a first print medium sides of which are distinguished from each other, and second double-side printing when the double-side printing is designated to a second print medium sides of which are not distinguished from each other, and a print page printed on a first surface set face-down when being fed out of a plurality of print pages included in print data is different between the first double-side printing and the second double-side printing.

10 Claims, 11 Drawing Sheets

PRINTING SYSTEM

The present application is based on, and claims priority from JP Application Serial Number 2022-091397, filed Jun. 6, 2022, the disclosure of which is hereby incorporated by reference herein in its entirety.

BACKGROUND

1. Technical Field

The present disclosure relates to a printing system.

2. Related Art

In the past, there has been known a printer which automatically performs printing on both surfaces of a print medium as in JP-A-2019-26444.

In some cases, it is desired to perform automatic double-side printing on a print medium such as a slip two sides of which are distinguished from each other so that predetermined pages are printed on the two sides as print pages. In this case, it is required to perform printing in good condition.

SUMMARY

In view of the problems described above, a printing system includes a printing mechanism configured to perform printing on a print medium set at a print position, and a carrying mechanism configured to carry the print medium set on the carrying mechanism to the print position, flip sides of the print medium on which the printing is performed and then carry the print medium once again to the print position, and further discharge the print medium, wherein the printing mechanism is configured to perform, when setting except a paper designation in the printing and double-side printing setting is common to single-side printing, first double-side printing, and second double-side printing, the single-side printing when the single-side printing is designated to a first print medium sides of which are distinguished from each other, the first double-side printing when the double-side printing is designated to the first print medium, and the single-side printing when the single-side printing is designated to a second print medium sides of which are not distinguished from each other, and the second double-side printing when the double-side printing is designated to the second print medium, and a print page printed on a first surface set face-down when being fed out of a plurality of print pages included in print data is different between the printing, and a number of times of flipping of the sides of the first print medium in the first double-side printing and a number of times of flipping of the sides of the second print medium in the second double-side printing are same as each other.

DESCRIPTION OF EXEMPLARY EMBODIMENTS

(1) First Embodiment

Figure 1:
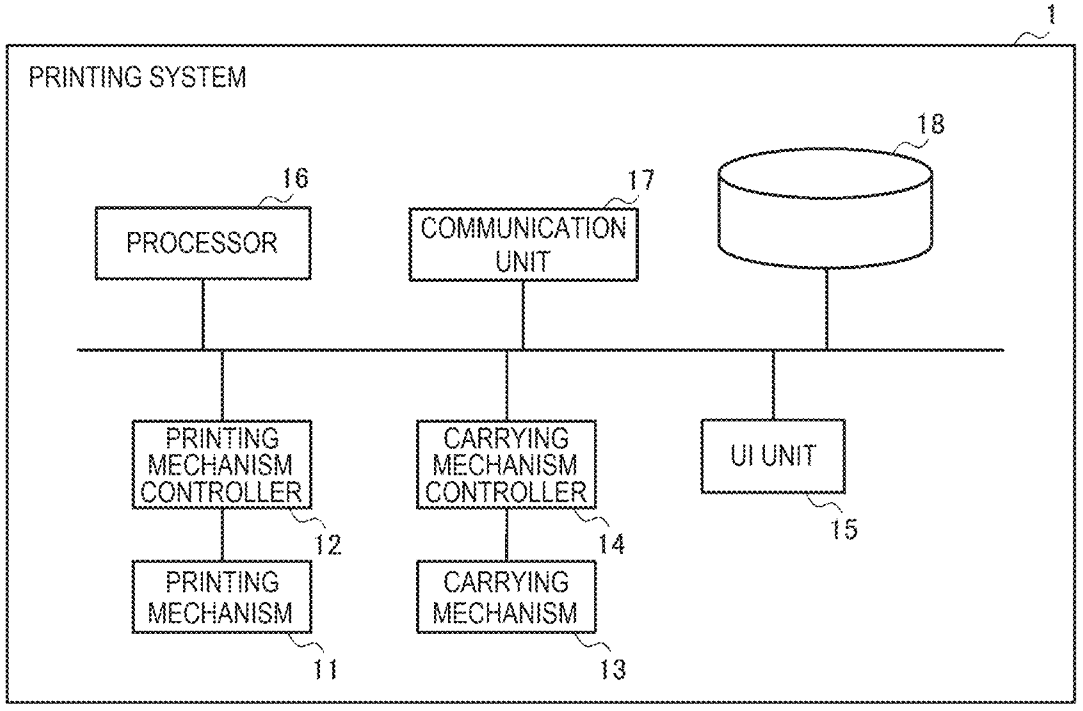
FIG. 1 is a schematic configuration diagram of a printing system.

FIG. 1 is a schematic configuration diagram of a printing system according to a first embodiment. The printing system 1 is mainly provided with a printing mechanism 11, a printing mechanism controller 12, a carrying mechanism 13, a carrying mechanism controller 14, a UI unit 15, a processor 16, a communication unit 17, and a nonvolatile memory 18.

The UI unit 15 includes a touch panel display, a variety of keys and switches, and so on. The processor 16 is provided with a CPU, a ROM, a RAM, and so on not shown, and executes a variety of programs recorded on the nonvolatile memory 18 to thereby control each part of the printing system 1. The communication unit 17 includes a communication interface for performing communication with external equipment in compliance with a variety of wired or wireless communication protocols. The printing system 1 communicates with other devices via the communication unit 17. The communication unit 17 includes an interface for communicating with a variety of removable memory devices attached to the printing system 1.

The printing mechanism 11 performs printing on a print medium. The printing mechanism controller 12 controls operations of the printing mechanism 11. The carrying mechanism 13 performs transportation of the print medium in the printing system 1. The carrying mechanism controller 14 controls operations of the carrying mechanism described later.

Figure 2:
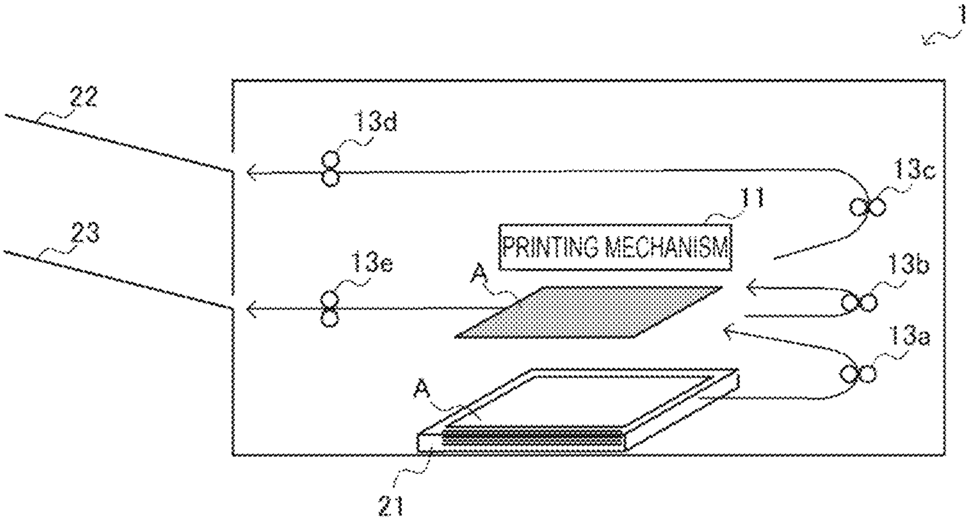
FIG. 2 is a schematic configuration diagram of a paper feed tray, a carrying mechanism, a printing mechanism, and a paper catcher.

FIG. 2 is a schematic configuration diagram of the printing mechanism 11, the carrying mechanism 13, a paper feed tray 21, a face-down paper catcher 22, and a face-up paper catcher 23 all provided to the printing system 1. To the paper feed tray 21, there are set the print media A with obverse surfaces facing vertically downward. Hereinafter, a vertically downward direction is simply referred to as a downward direction, and the reverse direction thereof is referred to as an upward direction. It should be noted that the downward direction and the upward direction can be directions tilted from the vertically downward direction and the vertically upward direction, respectively.

As shown in FIG. 2, in a carrying path of the print medium A, there is arranged a plurality of carrying rollers 13*a* through 13*e* as the carrying mechanism 13. On the carrying path formed of the carrying rollers 13*a* through 13*e*, there is disposed the printing mechanism 11.

The print medium is carried to a position corresponding to the printing mechanism 11, and printing on the print medium by the printing mechanism 11 is performed. The position of the print medium corresponding to the printing mechanism 11 is hereinafter referred to as a print position. The carrying rollers 13*a* flip the sides of the print medium discharged from the paper feed tray 21, and then carry the print medium thus flipped to the print position. The carrying rollers 13*b* flip the print medium one side of which has been printed, and then carry the print medium to the print position once again when performing double-side printing. The print medium having been printed is discharged to the face-down paper catcher 22 or the face-up paper catcher 23. When the print medium is discharged to the face-down paper catcher 22, the sides of the print medium are flipped by the carrying rollers 13*c*, and the print medium is carried to the face-down paper catcher 22 via the carrying rollers 13*d*. When the print medium is discharged to the face-up paper catcher 23, the print medium is carried to the face-up paper catcher 23 via the carrying rollers 13*e* with the sides not flipped. As described above, the printing system 1 according to the present embodiment is provided with the two paper catchers, namely the face-down paper catcher 22 and the face-up paper catcher 23.

It should be noted that the carrying path of the print medium in the present embodiment is illustrative only. It is sufficient for the carrying mechanism 13 to be configured so that the carrying path including at least following three paths is realized. A first path is a path in which the print medium is carried to the print position in a state in which the sides are flipped from when the print medium is fed. A second path is a path of flipping the sides of the print medium having been printed. A third path is a path of carrying the print medium having been printed to the face-down paper catcher 22 and the face-up paper catcher 23.

A printing method by the printing mechanism 11 is not particularly limited, and for example, an inkjet method or an electrophotographic method is adopted. The printing mechanism 11 is provided with an actuator, a variety of devices, a sensor, a drive circuit, a mechanical component, and so on for executing printing, wherein these constituents are controlled by the printing mechanism controller 12.

Further, the carrying rollers 13*a* through 13*e* as the carrying mechanism 13 are each constituted by a pair of rollers having pressure contact with each other. In each of the carrying rollers 13*a* through 13*e*, at least one of the rollers is rotationally driven through a drive mechanism mainly formed of an electric motor to thereby carry the print medium under the control by the carrying mechanism controller 14.

Figure 3:
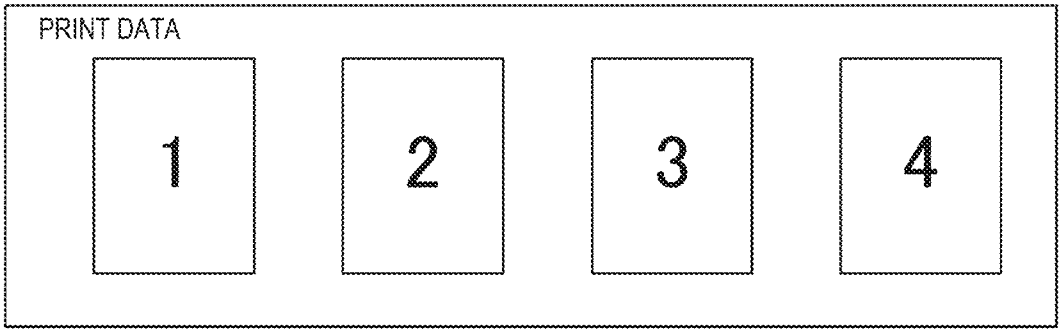
FIG. 3 is a diagram showing an example of print data.

Then, when performing printing corresponding to the print data constituted by four pages consisting of a first page, a second page, a third page, and a fourth page as shown in FIG. 3 will be described. Here, the description will be presented assuming that setting such as a designation of the paper catcher except a paper designation in printing and double-side printing setting is common to single-side printing, first double-side printing, and second double-side printing described below. Further, for the sake of convenience of explanation, the description will be presented citing a print medium having an obverse surface and a reverse surface different in color from each other as an example. Specifically, it is assumed that the print medium has a gray obverse surface and a white reverse surface. Here, when feeding the paper, the obverse surface is set face-down as shown in FIG. 2. Here, the obverse surface is an example of a first surface.

Figure 4:
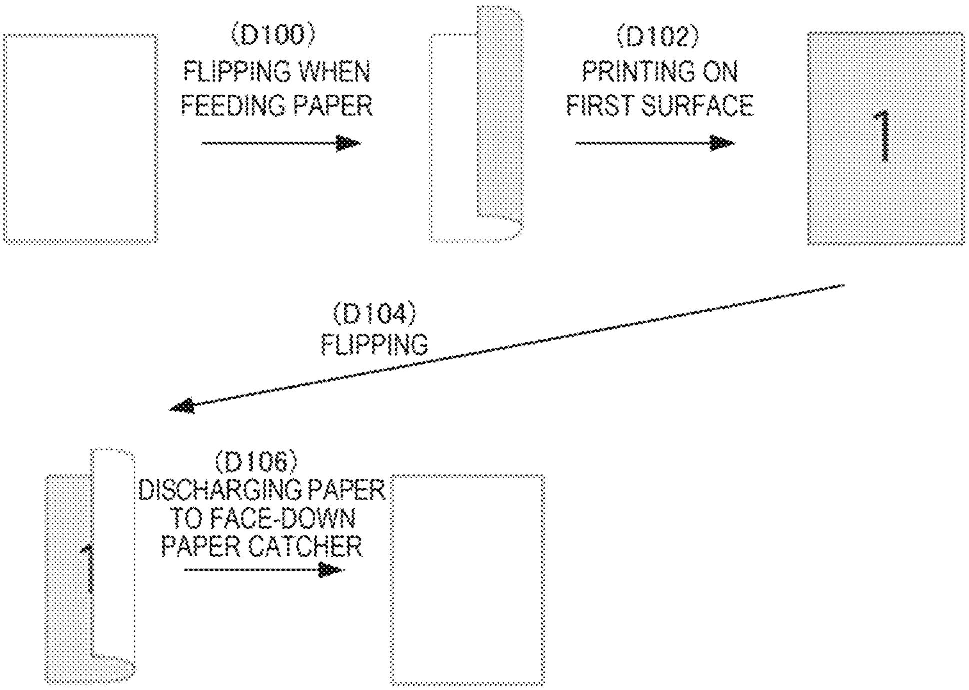
FIG. 4 is an explanatory diagram of an operation in single-side printing.

FIG. 4 is a diagram for explaining an operation in the single-side printing. First, the carrying mechanism 13 flips (D100) the sides of the print medium discharged from the paper feed tray 21, and then carries the print medium thus flipped to the print position. Then, the printing mechanism 11 prints (D102) the first page of the print data on the obverse surface, namely the gray surface, of the print medium as a first sheet. Then, the carrying mechanism 13 flips (D104) the sides of the print medium on which the printing has been performed. Then, the carrying mechanism 13 discharges (D106) the print medium to the face-down paper catcher 22 in a state in which the obverse surface of the print medium faces downward. The second page and the subsequent pages of the print data are also printed in substantially the same manner. Thus, the four print media with the first page through the fourth page respectively printed on the obverse surfaces are discharged to the face-down paper catcher 22 in sequence. As described above, in the single-side printing, the printing is performed in the order of the first page, the second page, the third page, and the fourth page, and the print media are discharged to the face-down paper catcher 22.

Then, a printing operation when the double-side printing is designated will be described. The printing system 1 according to the present embodiment is capable of executing the first double-side printing and the second double-side printing as the double-side printing. The first double-side printing is double-side printing which is performed when the double-side printing is designated to the print medium the sides of which are distinguished from each other, and in which numbers of the pages to be printed on the respective sides are designated. Specifically, in the first double-side printing, odd pages are printed on the obverse surfaces and even pages are printed on the reverse surfaces in such a manner that the first page is printed on the obverse surface (the first surface) and the second page is printed on the reverse surface. In contrast, the second double-side printing is double-side printing which is performed when the double-side printing is designated to the print medium the sides of which are not distinguished from each other, and in which the respective pages are printed without distinguishing the sides from each other. Specifically, in the second double-side printing, the pages to be printed on the respective sides are different from those in the first double-side printing in such a manner that the second page is printed on the obverse surface and the first page is printed on the reverse surface. The printing operation is different between the first double-side printing and the second double-side printing. It should be noted that the single-side printing is realized by substantially the same printing operation with respect to both of the print medium the sides of which are distinguished from each other and the print medium the sides of which are not distinguished from each other. Hereinafter, the printing operations will be described. It should be noted that the print medium the sides of which are distinguished from each other is an example of a first print medium, and the print medium the sides of which are not distinguished from each other is an example of a second print medium.

Figure 5:
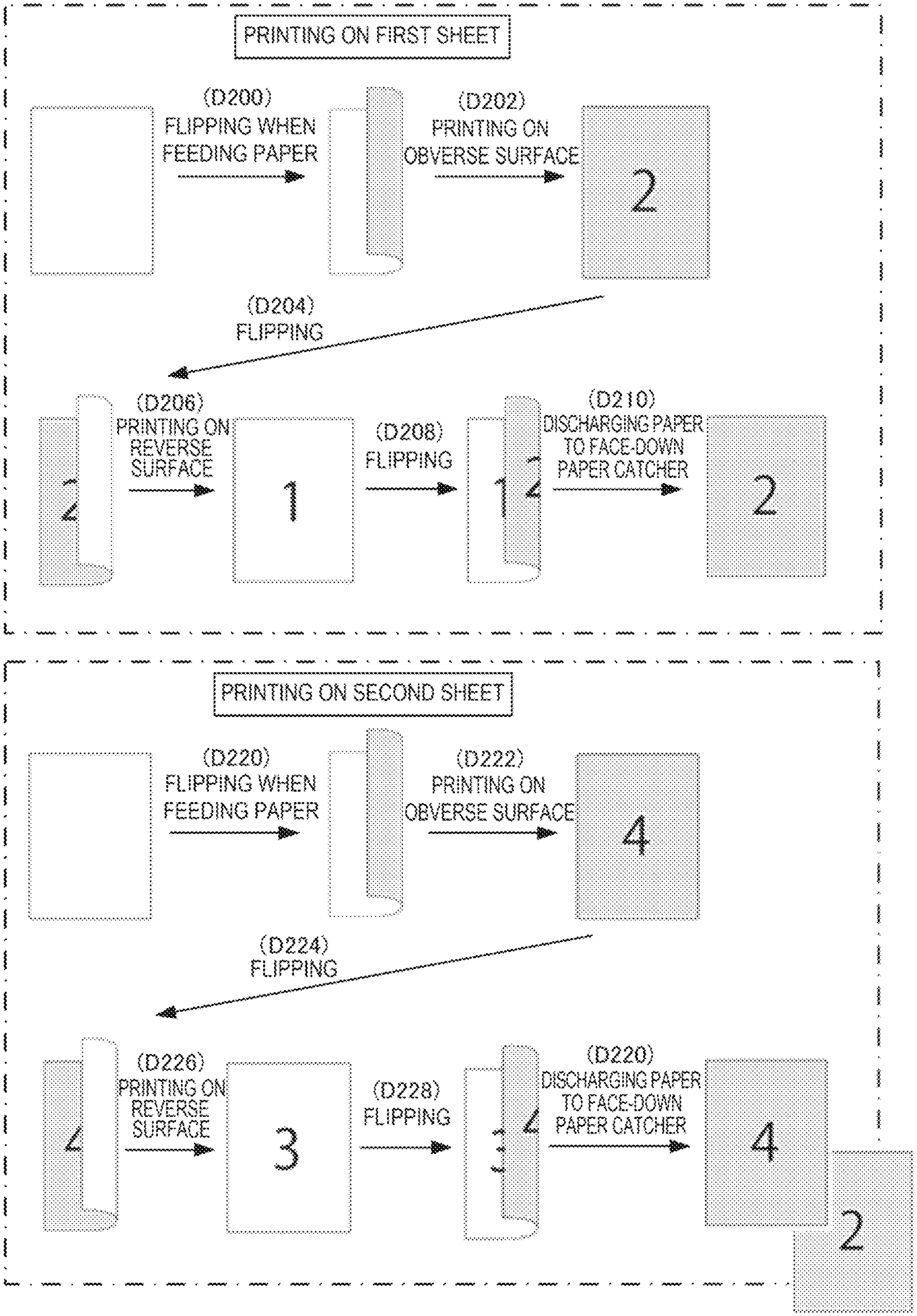
FIG. 5 is an explanatory diagram of an operation in second double-side printing.

FIG. 5 is a diagram for explaining an operation in the second double-side printing. First, the carrying mechanism 13 flips (D200) the sides of the print medium as a first sheet discharged from the paper feed tray, and then carries the print medium as the first sheet thus flipped to the print position. Since the print medium is fed in the state in which the obverse surface faces downward, the obverse surface turns to the face-up state due to the flip in D200. Then, the printing mechanism 11 prints (D202) the second page of the print data on the obverse surface, namely the gray surface, of the print medium as the first sheet. Then, the carrying mechanism 13 flips (D204) the sides of the print medium on which the printing has been performed, and then carries the print medium thus flipped to the print position. Then, the printing mechanism 11 prints (D206) the first page of the print data on the reverse surface, namely the white surface, of the print medium as the first sheet. Then, the carrying mechanism 13 flips (D208) the sides of the print medium on which the printing has been performed, and then discharges (D210) the print medium as the first sheet to the face-down paper catcher 22 in the state in which the obverse surface on which the second page has been printed faces upward.

Then, the carrying mechanism 13 flips (D220) the sides of the print medium as a second sheet thus fed, and then carries the print medium as the second sheet thus flipped to the print position. Then, the printing mechanism 11 prints (D222) the fourth page of the print data on the obverse surface of the print medium as the second sheet. Then, the carrying mechanism 13 flips (D224) the sides of the print medium on which the printing has been performed, and then carries the print medium thus flipped to the print position. Then, the printing mechanism 11 prints (D226) the third page on the reverse surface of the print medium as the second sheet. Then, the carrying mechanism 13 flips (D228) the sides of the print medium on which the printing has been performed, and then discharges (D220) the print medium as the second sheet to the face-down paper catcher 22 in the state in which the obverse surface on which the fourth page has been printed faces upward. Thus, the print medium as the second sheet in the state in which the fourth page faces upward is discharged on the print medium as the first sheet in the state in which the second page faces upward. In other words, the first page and the second page are printed respectively on the reverse surface and the obverse surface of the print medium as the first sheet, and the third page and the fourth page are printed respectively on the reverse surface and the obverse surface of the print medium as the second sheet.

Figure 6:
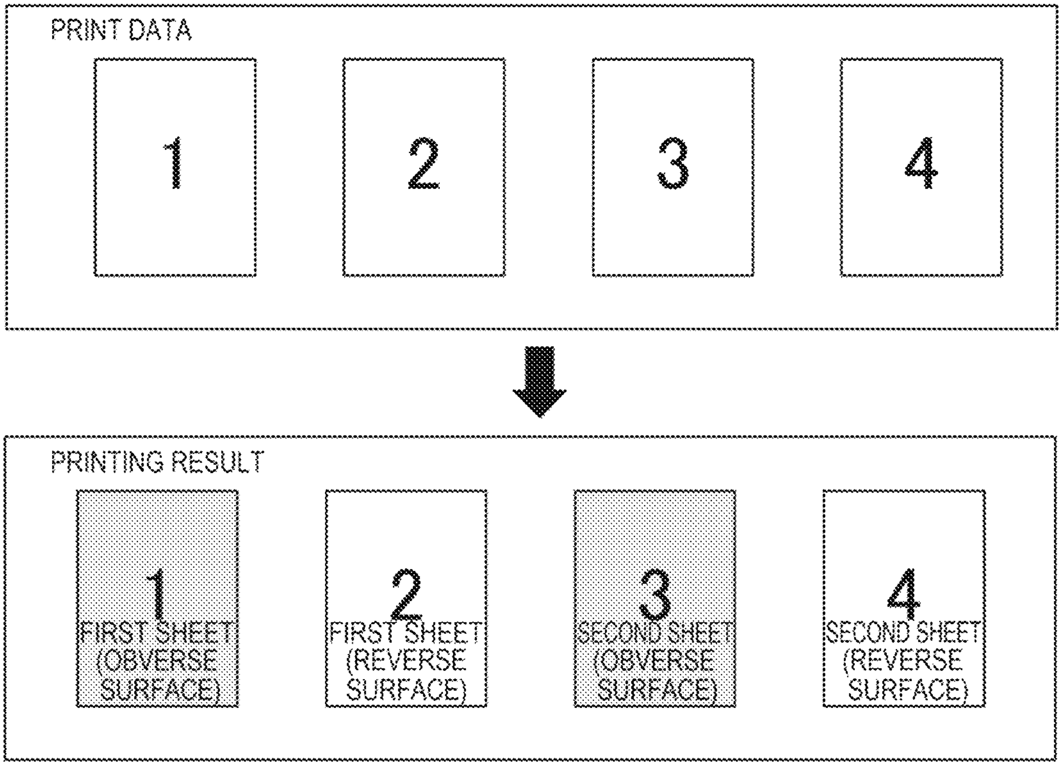
FIG. 6 is a diagram showing a printing result expected in first double-side printing.

Then, the first double-side printing will be described. FIG. 6 shows a printing result expected in the first double-side printing. As shown in FIG. 6, it is assumed that there is expected a printing result in which the first page is printed on the obverse surface of the print medium as the first sheet, the second page is printed on the reverse surface of the print medium as the first sheet, the third page is printed on the obverse surface of the print medium as the second sheet, and the fourth page is printed on the reverse surface of the print medium as the second sheet. An operation in the first double-side printing for obtaining such a printing result will be described with reference to FIG. 7.

Figure 7:
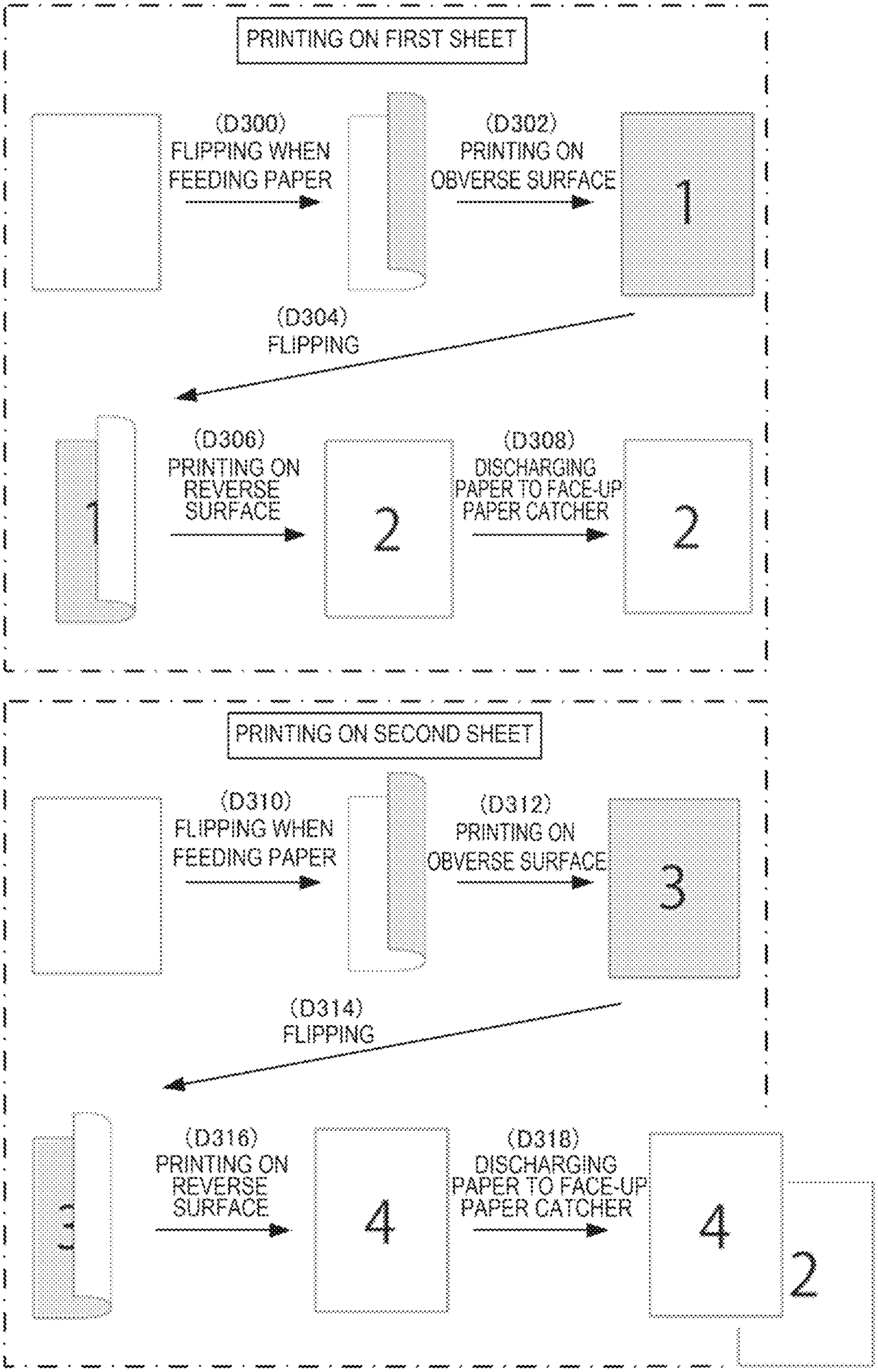
FIG. 7 is an explanatory diagram of an operation in the first double-side printing.

As shown in FIG. 7, in the first double-side printing, first, the carrying mechanism 13 flips (D300) the sides of the print medium as the first sheet thus fed, and then carries the print medium as the first sheet thus flipped to the print position. Then, the printing mechanism 11 prints (D302) the first page of the print data on the obverse surface, namely the gray surface, of the print medium as the first sheet. Then, the carrying mechanism 13 flips (D304) the sides of the print medium on which the printing has been performed, and then carries the print medium thus flipped to the print position. Then, the printing mechanism 11 prints (D306) the second page of the print data on the reverse surface, namely the white surface, of the print medium as the first sheet. Then, the carrying mechanism 13 discharges (D308) the print medium as the first sheet to the face-up paper catcher 23 in the state in which the reverse surface on which the second page has been printed faces upward without flipping the sides of the print medium on which the printing has been performed.

Then, the carrying mechanism 13 flips (D310) the sides of the print medium as the second sheet thus fed, and then carries the print medium as the second sheet thus flipped to the print position. Then, the printing mechanism 11 prints (D312) the third page of the print data on the obverse surface of the print medium as the second sheet. Then, the carrying mechanism 13 flips (D314) the sides of the print medium on which the printing has been performed, and then carries the print medium thus flipped to the print position. Then, the printing mechanism 11 prints (D316) the fourth page on the reverse surface of the print medium as the second sheet. Then, the carrying mechanism 13 discharges (D318) the print medium as the second sheet to the face-up paper catcher 23 in the state in which the reverse surface on which the fourth page has been printed faces upward without flipping the sides of the print medium on which the printing has been performed.

Thus, the print medium as the second sheet in the state in which the fourth page faces upward is discharged on the print medium as the first sheet in the state in which the second page faces upward. Further, the first page and the third page are printed respectively on the obverse surfaces of the print medium as the first sheet and the print medium as the second sheet, and the second page and the fourth page are printed respectively on the reverse surfaces of the print medium as the first sheet and the print medium as the second sheet. As described above, in the first double-side printing, it is possible to obtain the printing result in which the predetermined pages are printed on the respective sides as shown in FIG. 6.

As described above, while the second page and the fourth page are printed on the obverse surfaces of the print media in the second double-side printing, the first page and the third page are printed on the obverse surfaces of the print media in the first double-side printing. In other words, between the first double-side printing and the second double-side printing, different pages of the print data are printed on the obverse surface (the first surface), and at the same time, a plurality of print pages are printed in a different printing order. On the other hand, in the first double-side printing and the second double-side printing, the number of times the sides are flipped in order to perform printing on the both surfaces of the print medium is equal. Specifically, in the second double-side printing, the flipping is performed in D200 and D204, and therefore, the total number of times of flipping with respect to each print medium is two. In the first double-side printing, the flipping is performed in D300 and D304, and therefore, the total number of times of flipping with respect to each print medium is two. It should be noted that the flipping in D208 in the second double-side printing is the flipping for discharging the sheet, but is not the flipping for executing the printing. Further, the print medium is discharged to the face-up paper catcher 23 in the first double-side printing, and is discharged to the face-down paper catcher 22 in the second double-side printing. As described above, the discharge destination of one of the printing is the face-up paper catcher, and the discharge destination of the other is the face-down paper catcher.

Thus, it is possible to uniform the order of pages in the print media discharged in either of the first double-side printing and the second double-side printing, and it is possible to complete the printing in the second double-side printing in substantially the same printing time as in the first double-side printing.

Figure 8:
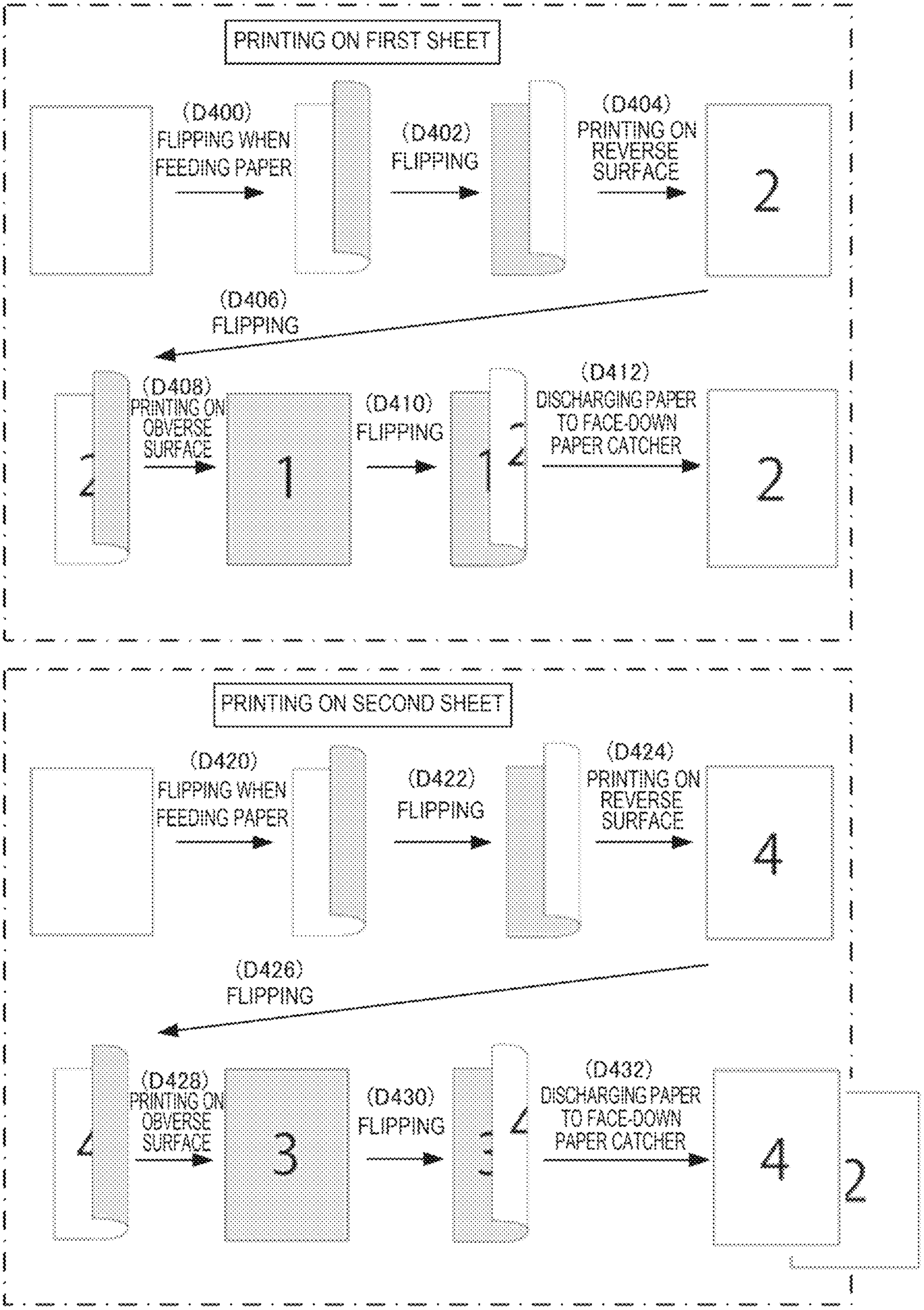
FIG. 8 is an explanatory diagram of an operation related to a related-art example.

FIG. 8 is a diagram for explaining an operation in a third double-side printing as double-side printing in the related-art printing system for realizing such a printing result that the pages are printed in ascending order in the order of an obverse surface and a reverse surface similarly to the first double-side printing. First, the carrying mechanism 13 flips (D400) the sides of the print medium as a first sheet thus fed, and then further flips (D402) the sides of the print medium as the first sheet. Thus, there is created the state in which the reverse surface of the print medium faces upward. The print medium is carried to the print position in this state. Then, the printing mechanism 11 prints (D404) the second page of the print data on the reverse surface, namely the white surface, of the print medium as the first sheet. Then, the carrying mechanism 13 flips (D406) the sides of the print medium on which the printing has been performed, and then carries the print medium thus flipped to the print position. Then, the printing mechanism 11 prints (D408) the first page of the print data on the obverse surface, namely the gray surface, of the print medium as the first sheet. Then, the carrying mechanism 13 flips (D410) the sides of the print medium on which the printing has been performed, and then discharges (D412) the print medium as the first sheet to the face-down paper catcher 22 in the state in which the reverse surface on which the second page has been printed faces upward.

Then, the carrying mechanism 13 flips (D420, D422) twice the sides of the print medium as the second sheet thus fed, and then carries the print medium as the second sheet thus flipped to the print position. Then, the printing mechanism 11 prints (D424) the fourth page of the print data on the reverse surface of the print medium as the second sheet. Then, the carrying mechanism 13 flips (D426) the sides of the print medium on which the printing has been performed, and then carries the print medium thus flipped to the print position. Then, the printing mechanism 11 prints (D428) the third page on the obverse surface of the print medium as the second sheet. Then, the carrying mechanism 13 flips (D430) the sides of the print medium on which the printing has been performed, and then discharges (D432) the print medium as the second sheet to the face-down paper catcher 22 in the state in which the reverse surface on which the fourth page has been printed faces upward. Thus, the print medium as the second sheet in the state in which the fourth page faces upward is discharged on the print medium as the first sheet in the state in which the second page faces upward.

As described above, in the third double-side printing according to the related-art printing system, the total number of times the sides are flipped for performing printing on the both surfaces of the print medium is three, namely D400, D402, and D406. In other words, the number of times of flipping in the third double-side printing is larger than the number of times of flipping related to printing in the first double-side printing according to the present embodiment described with reference to FIG. 7. Therefore, in the third double-side printing, the printing time becomes longer than in the first double-side printing and the second double-side printing. In other words, in the first double-side printing, it is possible to complete the printing in a shorter period of time than in the third double-side printing.

Figure 9:
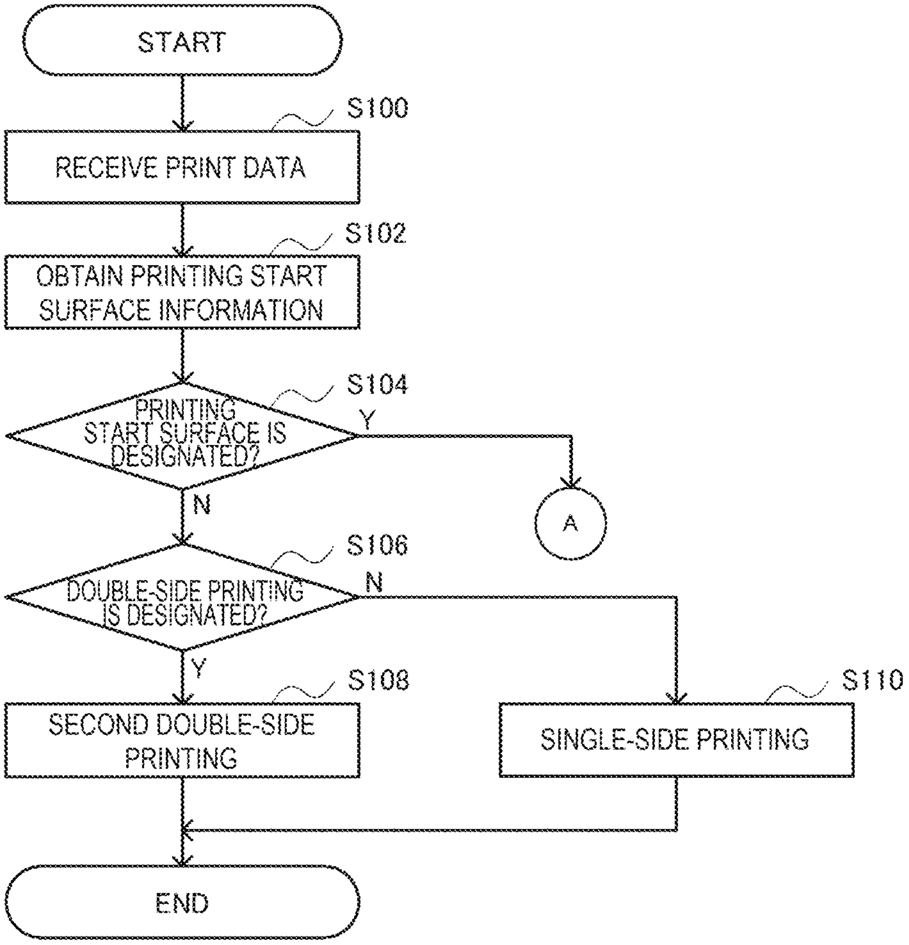
FIG. 9 is a flowchart showing print control processing.
Figure 10:
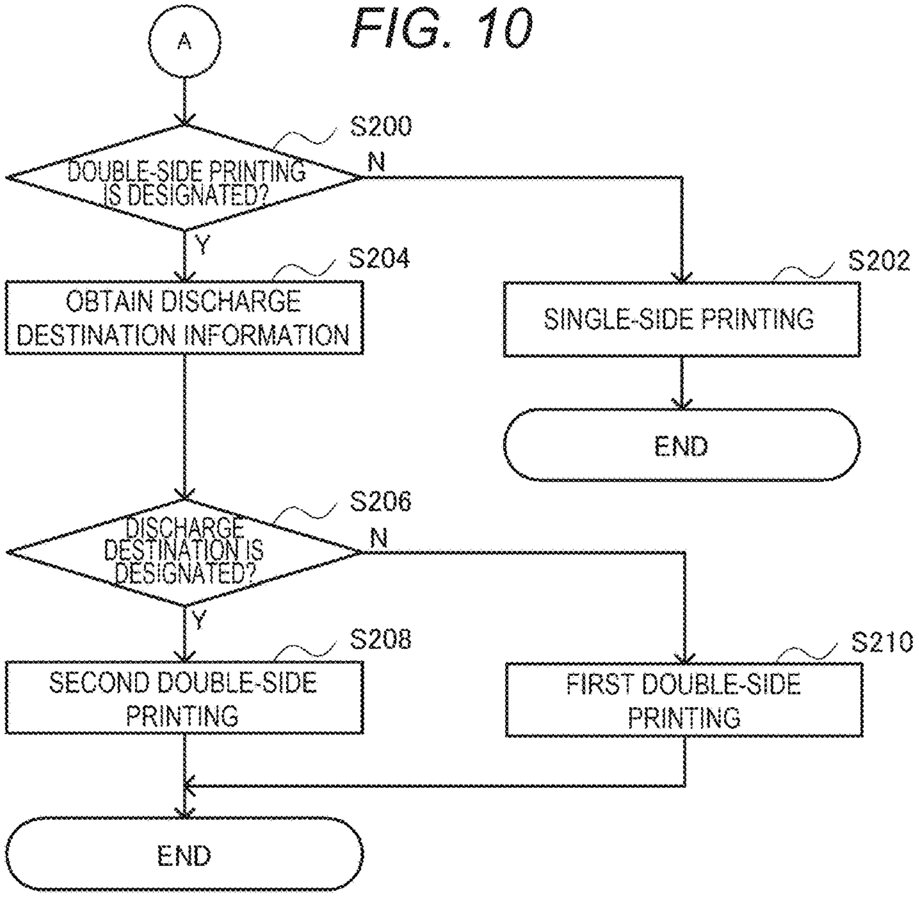
FIG. 10 is a flowchart showing the print control processing.

Then, print control processing in the printing system 1 will be described with reference to FIG. 9 and FIG. 10. The processor 16 first receives (the step S100) the print data from a printer driver in an external device via the communication unit 17. It should be noted that the processor 16 obtains print configuration information together with the print data. The print configuration information is information representing a configuration related to printing of the print data. The print configuration information includes printing start surface information, printing surface information, and discharge destination information. The printing start surface information is information representing presence or absence of the designation of setting the obverse surface of the print medium as a printing start surface as a surface on which the first page is printed. The printing surface information is information of designating one of the double-side printing and the single-side information. The discharge destination information is information representing presence or absence of the designation of the discharge destination. It should be noted that when the discharge destination is designated, the information of designating the paper catcher as the discharge destination is also included in the discharge destination information.

Then, the processor 16 obtains (the step S102) the printing start surface information received with the print data, to confirm (the step S104) whether or not the printing start surface is designated in the printing start surface information. When the printing start surface is not designated (N in the step S104), the processor 16 confirms (the step S106) whether or not the double-side printing is designated in the printing surface information. When the double-side printing is designated (Y in the step S106), the processor 16 performs the control (the step S108) of executing the second double-side printing as described with reference to FIG. 5, and then terminates the processing. Specifically, the processor 16 instructs the control for realizing the second double-side printing to the printing mechanism controller 12 and the carrying mechanism controller 14. Thus, the second double-side printing is performed due to the operation of the printing mechanism 11 and the carrying mechanism 13. In other words, in this case, the print medium on which the printing has been performed is discharged to the face-down paper catcher 22.

In contrast, when the single-side printing is designated (N in the step S106) in the step S106, the processor 16 performs the control (the step S110) of executing the single-side printing as described with reference to FIG. 4, and then terminates the processing.

When the printing start surface is designated (Y in the step S104) in the step S104, the processor 16 confirms (the step S200) whether or not the double-side printing is designated in the printing surface information. When the single-side printing is designated (N in the step S200), the processor 16 performs the control (the step S202) of executing the single-side printing as described with reference to FIG. 4, and then terminates the processing.

When the double-side printing is designated (Y in the step S200) in the step S200, the processor 16 obtains (the step S204) the discharge destination information to confirm (step S206) whether or not the discharge destination is designated in the discharge destination information. When the discharge destination is designated (Y in the step S206), the processor 16 performs the control (step S208) of executing the second double-side printing as described with reference to FIG. 5, and then terminates the processing. Further, when the discharge destination is not designated in the step S206, namely when the discharge destination is automatically set (N in the step S206), the processor 16 performs the control (step S210) of executing the first double-side printing as described with reference to FIG. 7, and then terminates the processing. In other words, in this case, the print medium on which the printing has been performed is discharged to the face-up paper catcher 23. It should be noted that it is possible for the processor 16 to perform the control of proceeding the process to the step S210 to perform the first double-side printing when the discharge destination is the face-up paper catcher 23 even when the discharge destination is designated.

As described hereinabove, in the printing system 1 according to the present embodiment, it is possible to make the pages to be printed on the respective sides different without increasing the number of times of flipping of the print medium related to the printing in the first double-side printing compared to the number of times of flipping of the print medium related to the printing in the second double-side printing. In other words, in the printing system 1 according to the present embodiment, even in the first double-side printing in which the pages to be printed on the respective sides are different from those in the second double-side printing, it is possible to prevent the time necessary for printing from increasing.

A first modified example of the first embodiment will be described. In the present embodiment, the description is presented citing when the number of print pages included in the print data is four as an example, but the number of the print pages included in the print data is not limited to four.

Further, as a second modified example, the print medium (the first print medium) the sides of which are distinguished from each other and the print medium (the second print medium) the sides of which are not distinguished from each other are not limited to the print medium the sides of which are different in color from each other. For example, the first print medium can be a medium having surfaces, wherein a pattern, a frame, a character, or the like is printed on at least one of the surfaces before the printing by the printing mechanism 11 is performed thereon. Further, the second print medium can be a medium having surfaces, wherein printing is performed on none of the surfaces. Further, the second print medium can be a medium having surfaces both of which are provided with the same pattern or the like printed at respective positions corresponding to each other.

Further, as a third modified example, it is sufficient that the discharge destination of one of the first double-side printing and the second double-side printing is the face-up paper catcher, and the discharge destination of the other is the face-down paper catcher. Specifically, depending on the carrying mechanism, it is possible that the discharge destination in the first double-side printing is the face-down paper catcher, and the discharge destination in the second double-side printing is the face-up paper catcher.

(2) Second Embodiment

Then, a printing system 1 according to a second embodiment will be described focusing mainly on a difference from the printing system according to the first embodiment. The first double-side printing by the printing system 1 according to the second embodiment is different from the first double-side printing by the printing system 1 according to the first embodiment.

The operations of the printing mechanism 11 and the carrying mechanism 13 in the first double-side printing according to the second embodiment are substantially the same as the operations of the printing mechanism 11 and the carrying mechanism 13 in the second double-side printing according to the first embodiment. On the other hand, in the first double-side printing, the order of the pages in the print data transmitted from a printing device of the external device is different from that of the print data transmitted in the second double-side printing.

Figure 11:
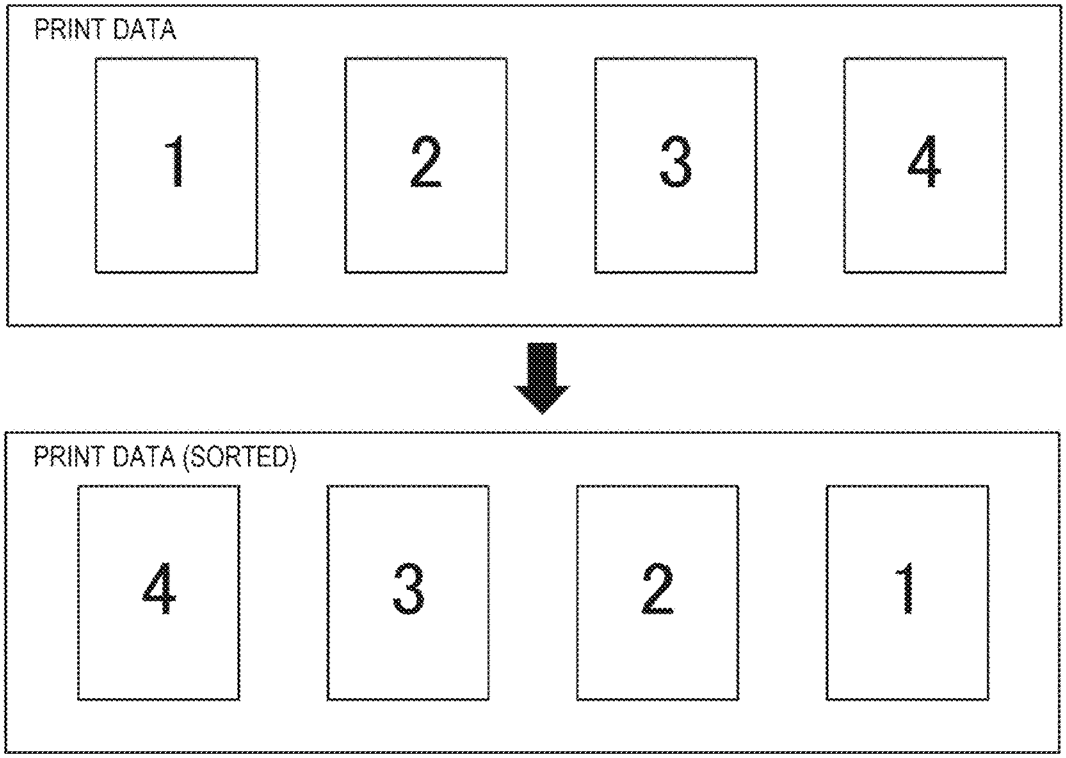
FIG. 11 is an explanatory diagram of sorting of pages in print data.
Figure 12:
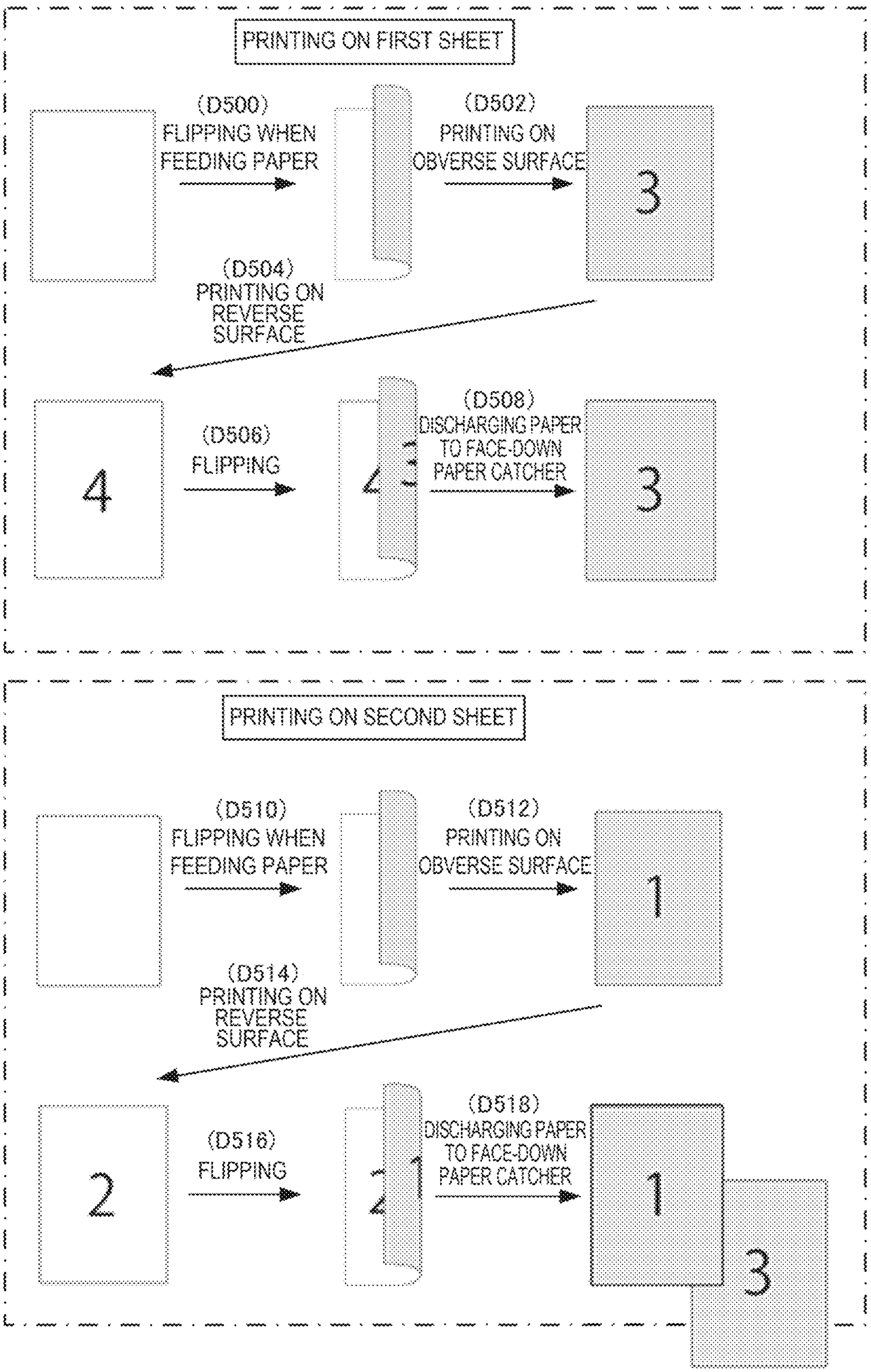
FIG. 12 is an explanatory diagram of an operation in first double-side printing according to a second embodiment.

A printing driver (not shown) of the external device transmits the print data to the printing system 1 in the state in which the order of the print pages is sorted into the descending order when the double-side printing to the print medium the sides of which are distinguished from each other is designated by the user. For example, as shown in FIG. 11, in the case of the print data including the first page through the fourth page, the printing device sorts the order of the pages into the fourth page, the third page, the second page, and the first page. Further, in the case of the double-side printing with respect to the print medium the sides of which are distinguished from each other, namely the double-side printing in which the printing start surface is designated, the printing system 1 performs substantially the same operation as the first double-side printing described in the first embodiment on the print data in which the order of the pages is sorted. The operation in the double-side printing when the printing start surface is designated in the second embodiment will be described with reference to FIG. 12.

First, the carrying mechanism 13 flips (D500) the sides of the print medium as the first sheet thus fed, and then carries the print medium as the first sheet thus flipped to the print position. Then, the printing mechanism 11 prints (D502) the third page arranged at the second position from the head of the print data on the obverse surface of the print medium as the first sheet. Subsequently, the sides of the print medium on which the printing has been performed are flipped, and the printing mechanism 11 prints (D504) the fourth page arranged at the head of the print data on the reverse surface of the print medium as the first sheet. Then, the carrying mechanism 13 flips (D506) the sides of the print medium on which the printing has been performed, and then discharges (D508) the print medium as the first sheet to the face-down paper catcher 22 in the state in which the obverse surface on which the third page has been printed faces upward.

Then, the carrying mechanism 13 flips (D510) the sides of the print medium as the second sheet thus fed, and then carries the print medium as the second sheet thus flipped to the print position. Then, the printing mechanism 11 prints (D512) the first page arranged at the fourth position from the head of the print data on the obverse surface of the print medium as the second sheet. Subsequently, the sides of the print medium on which the printing has been performed are flipped, and the printing mechanism 11 prints (D514) the second page arranged at the third position from the head of the print data on the reverse surface of the print medium as the second sheet. Then, the carrying mechanism 13 flips (D516) the sides of the print medium on which the printing has been performed, and then discharges (D518) the print medium as the second sheet to the face-down paper catcher 22 in the state in which the obverse surface on which the first page has been printed faces upward.

Thus, the print medium as the second sheet in the state in which the first page faces upward is discharged on the print medium as the first sheet in the state in which the third page faces upward. In other words, the first page and the second page are printed respectively on the obverse surface and the reverse surface of the print medium as the second sheet, and the third page and the fourth page are printed respectively on the obverse surface and the reverse surface of the print medium as the first sheet. It should be noted that other configurations and operations of the printing system 1 according to the second embodiment than the above are substantially the same as the configurations and operations of the printing system 1 according to the first embodiment.

As described above, in the second embodiment, the printing is performed in the order of the third page, the fourth page, the first page, and the second page included in the print data, and the print media are discharged to the face-down paper catcher 22 in the first double-side printing. On the other hand, in the second double-side printing, the printing is performed in the order of the second page, the first page, the fourth page, and the third page, and the print media are discharged to the face-down paper catcher 22.

As described hereinabove, also in the second embodiment, it is possible to print the predetermined pages on the sides of the print medium the sides of which are distinguished from each other without increasing the number of times of flipping of the print medium related to the printing.

As a first modified example of the second embodiment, it is possible to start the printing from the print medium on which the last page is printed in one of the first double-side printing and the second double-side printing, and start the printing from the print medium on which the first page is printed in the other thereof. In other words, it is possible to execute the printing in sequence from the print medium on which the last page included in the print data is printed toward the print medium on which the first page included in the print data is printed in one of the first double-side printing and the second double-side printing. Further, in the other thereof, it is possible to execute the printing in sequence from the print medium on which the first page is printed to the print medium on which the last page is printed.

As a second modified example, it is also possible to perform the sorting of the pages in a similar manner with respect to the print data stored in the storage of the printing system 1. In other words, when the double-side printing to the print medium the sides of which are distinguished from each other is designated, it is possible for the printing driver to perform the sorting of the pages of the print data in the printing system 1.

(3) Supplementary Note

The embodiments described above are each an example for implementing the present disclosure, and a variety of embodiments can be adopted besides the above. It is possible to make a variety of modifications/alterations within the scope or the spirit of the present disclosure set forth in the appended claims such as applying one modified example to another modified example.

Further, the embodiments described above are not at all limit the present disclosure. Since the embodiments includes a plurality of disclosures different in advantages from each other, a certain problem or a certain advantage which can be figured out from each of the embodiments is not necessarily a problem or an advantage for all of the disclosures included in the embodiments.

For example, the description is presented assuming that the printing is performed on the print medium set in the paper feed tray 21, but the present disclosure can also be applied to when performing the printing on the print medium set in a manual paper feed tray.

Further, the configuration in which the print medium set in the paper feed tray 21 or the manual paper feed tray is flipped and is then carried to the print position where the printing by the printing mechanism 11 is performed is not a limitation, and it is also possible to carry the print medium thus set to the print position where the printing by the printing mechanism is performed without flipping the print medium. In this case, the print medium is set upside down.

What is claimed is:

1. A printing system comprising:

a printing mechanism configured to perform printing on a print medium set at a print position; and a carrying mechanism configured to carry the print medium set on the carrying mechanism to the print position, flip sides of the print medium on which the printing is performed and then carry the print medium once again to the print position, and further discharge the print medium, wherein the printing mechanism is configured to perform, when setting except a paper designation in the printing and double-side printing setting is common to single-side printing, first double-side printing, and second double-side printing, the single-side printing when the single-side printing is designated to a first print medium sides of which are distinguished from each other, and the first double-side printing when double-side printing is designated to the first print medium, and the single-side printing when the single-side printing is designated to a second print medium sides of which are not distinguished from each other, and the second double-side printing when the double-side printing is designated to the second print medium, and a print page printed on a first surface set face-down when being fed out of a plurality of print pages included in print data is different between the first double-side printing and the second double-side printing.

2. The printing system according to claim 1, wherein a number of times of flipping of the sides of the first print medium in the first double-side printing and a number of times of flipping of the sides of the second print medium in the second double-side printing are same as each other.

3. The printing system according to claim 1, wherein a printing order of the plurality of print pages is different between the first double-side printing and the second double-side printing.

4. The printing system according to claim 3, wherein the printing is executed in sequence from the print medium on which a last page included in the print data is printed to the print medium on which a first page included in the print data is printed in one of the first double-side printing and the second double-side printing, and the printing is executed in sequence from the print medium on which the first page is printed to the print medium on which the last page is printed in another of the printing.

5. The printing system according to claim 4, wherein the printing is performed in an order of a third page, a fourth page, the first page, and a second page included in the print data, and then discharge to a face-down paper catcher is performed in the first double-side printing, and the printing is performed in an order of the second page, the first page, the fourth page, and the third page, and then the discharge to the face-down paper catcher is performed in the second double-side printing.

6. The printing system according to claim 4, wherein in the single-side printing, the printing is performed in an order of the first page, a second page, a third page, and a fourth page, and then discharge to a face-down paper catcher is performed.

7. The printing system according to claim 1, wherein discharge to a face-up paper catcher is performed in one of the first double-side printing and the second double-side printing, and discharge to a face-down paper catcher is performed in another of the first double-side printing and the second double-side printing.

8. The printing system according to claim 7, wherein in the first double-side printing, a first page included in the print data is printed, then a second page included in the print data is printed, and then the discharge to the face-up paper catcher is performed, and in the second double-side printing, the second page is printed, then the first page is printed, and then the discharge to the face-down paper catcher is performed.

9. The printing system according to claim 8, wherein in the single-side printing, the first page is printed, then the second page is printed, and then the discharge to the face-down paper catcher is performed.

10. The printing system according to claim 1, wherein the first print medium is a medium having surfaces, wherein printing is performed on at least one of the surfaces before the printing by the printing mechanism is performed, and the second print medium is a medium having surfaces, wherein printing is performed on none of the surfaces.

* * * * *